(12) United States Patent
Just

(10) Patent No.: US 11,579,048 B2
(45) Date of Patent: Feb. 14, 2023

(54) METHOD AND APPARATUS FOR TESTING ROLL TOGETHER

(71) Applicant: MADAD PTY LTD, Wacol (AU)

(72) Inventor: Morrison Just, Queensland (AU)

(73) Assignee: MADAD PTY. LTD., Queensland (AU)

( * ) Notice: Subject to any disclaimer, the term of this patent is extended or adjusted under 35 U.S.C. 154(b) by 971 days.

(21) Appl. No.: 16/342,559

(22) PCT Filed: Oct. 19, 2017

(86) PCT No.: PCT/AU2017/051132
§ 371 (c)(1),
(2) Date: Apr. 17, 2019

(87) PCT Pub. No.: WO2018/071973
PCT Pub. Date: Apr. 26, 2018

(65) Prior Publication Data
US 2020/0064231 A1 Feb. 27, 2020

(30) Foreign Application Priority Data

Oct. 19, 2016 (AU) .................. 2016904239

(51) Int. Cl.
*G01M 99/00* (2011.01)
*G01C 9/10* (2006.01)
(52) U.S. Cl.
CPC ............ *G01M 99/001* (2013.01); *G01C 9/10* (2013.01); *G01C 2009/102* (2013.01)

(58) Field of Classification Search
CPC .. G01M 99/001; G01C 9/10; G01C 2009/102
See application file for complete search history.

(56) References Cited

U.S. PATENT DOCUMENTS

| | | | |
|---|---|---|---|
| 6,561,047 B1* | 5/2003 | Gladney | A47C 31/123 73/865.3 |
| 6,786,083 B1* | 9/2004 | Bain | G01N 3/40 73/78 |
| 10,557,774 B2* | 2/2020 | Larson | A47C 27/148 |
| 11,319,976 B2* | 5/2022 | Carr | G08B 21/0286 |
| 2014/0053653 A1* | 2/2014 | McCollum | B25J 13/085 73/788 |
| 2014/0096588 A1* | 4/2014 | Wolkin | G01M 99/001 73/12.01 |
| 2014/0238104 A1* | 8/2014 | Wolkin | G01M 99/001 73/12.13 |
| 2015/0241332 A1 | 8/2015 | Amano et al. | |

(Continued)

OTHER PUBLICATIONS

International Search Report for International Application No. PCT/AU2017/051132, dated Dec. 21, 2017, 3 pages.

(Continued)

*Primary Examiner* — Max H Noori
(74) *Attorney, Agent, or Firm* — Edell, Shapiro & Finnan, LLC

(57) ABSTRACT

A method and apparatus for testing roll together of a mattress using two weights, preferably weighted cylinders, and moving one of the weights towards the other while measuring change in distance between the weights and changes in angle of the stationary weight.

22 Claims, 5 Drawing Sheets

(56) References Cited

U.S. PATENT DOCUMENTS

2016/0015184 A1\* 1/2016 Nunn ................... A47C 27/082
　　　　　　　　　　　　　　　　　　　　　　　　 700/282
2019/0285515 A1\* 9/2019 Larson ................ G01M 99/001

OTHER PUBLICATIONS

ITC Leggett & Platt International Technical Center Testing Document, published on Dec. 25, 2014 as per the Wayback Machine (found at https://web.archive.org/web/20141225224855/http://www.beddingcomponents.com:80/pdf/testing.pdf), 6 pages.

\* cited by examiner

METHOD AND APPARATUS FOR TESTING ROLL TOGETHER

FIELD OF THE INVENTION

The invention relates to a method of testing roll together characteristics of a mattress. In particular, the invention relates, but is not limited, to a method of testing and quantifying roll together characteristics of a mattress by varying displacement of two weighted members on the mattress and measuring changes in inclination caused as a result.

BACKGROUND TO THE INVENTION

Reference to background art herein is not to be construed as an admission that such art constitutes common general knowledge.

Mattresses are often used on bed bases, or the like, for resting and sleeping. It is fairly common for couples to sleep together on the same mattress. In such cases deflection of the mattress can cause a phenomenon known as 'roll together' whereby the weight of the users causes a depression which encourages the two users to roll together towards each other. It is generally considered as undesirable and many attempts have been made to try to overcome and prevent this phenomenon.

One solution is to have separate mattresses, one for each couple, arranged adjacent each other. But this construction then results in an uneven support profile over the entire width of the bed and often creates a region of unpleasant firmness between the two mattresses where they join. Accordingly, several various types of mattress constructions with different characteristics and success at preventing roll together, while still maintain a comfortable and supportive sleeping surface, have been attempted.

Such different mattresses have varying degrees of success at preventing roll together and it is not until a couple actually sleep on the mattress for a period of time that it is possible for them to assess the level of roll together. It is therefore very difficult to quantify and compare the amount of roll together present in a mattress, particularly at the time of purchase where is it not possible to sleep on the mattress with a partner for any great length of time.

OBJECT OF THE INVENTION

It is an aim of this invention to provide a method of testing roll together, or an apparatus for testing roll together, of a mattress which overcomes or ameliorates one or more of the disadvantages or problems described above, or which at least provides a useful commercial alternative.

Other preferred objects of the present invention will become apparent from the following description.

SUMMARY OF INVENTION

In one form, although it need not be the only or indeed the broadest form, there is provided a method of testing roll together of a mattress, the method comprising the steps of:
positioning a first weight and a second weight on the mattress a measured distance apart from each other;
moving the second weight relative to the first weight so that it is a different measured distance apart from the first weight; and
determining any change in angle of the first weight in response to the second weight being moved.

Preferably the measured distances are predetermined measured distances. Preferably the step of determining any change in angle of the first weight in response to the second weight being moved is performed at each of a plurality of predetermined measured distances apart.

Preferably the mass of at least one of the weights is variable. Preferably the method comprises the step of varying the mass of the weights until each weight has a predetermined mass. Preferably the step of moving the second weight relative to the first weight comprises moving the second weight closer towards the first weight.

Preferably at least one of the first weight and the second weight are weighted cylinders. Preferably the first weight is a first weighted cylinder and the second weight is a second weighted cylinder and preferably the weighted cylinders are interchangeable. Preferably the method comprises arranging the weighted cylinders with parallel rotational axes. Preferably the step of moving the second weight relative to the first weight comprises rolling the second weight.

Preferably the method comprises the step of determining measurement locations on the mattress. Preferably the step of determining measurement locations comprises marking one or more reference lines on the mattress. Preferably a plurality of reference lines are marked on the mattress. Preferably the step of placing a first weight and a second weight on the mattress a measured distance apart from each other comprises locating the first weight and the second weight on reference lines marked on the mattress.

Preferably the step of marking one or more reference lines on the mattress comprises determining a centre line of the mattress and measuring marking at least two reference lines a predetermined distance from the centre line. Preferably the step of marking one or more reference lines on the mattress comprises measuring a predetermined distance from one or more edges of the mattress and marking a reference line parallel to an edge of the mattress. Preferably the step of marking one or more reference lines on the mattress comprises marking a reference grid on the mattress.

Preferably the method comprises locating an arm on the first weight. Preferably the method comprises mounting one end of the arm on the first weight. Preferably the method comprises mounting the arm of an axial protrusion of the first weight. Preferably the method comprises locating the arm on the second weight. Preferably two arms are provided. Preferably the method comprises the step of mounting the arm on each end of the first weight. Preferably the method comprises the step of locating both arms on the second weight.

Preferably the arm has at least one recess. Preferably the arm has a plurality of recesses. Preferably the recesses are at predetermined measured distances. Preferably the step of locating the other end of the arm on the second weight comprises manoeuvring one or more of the first weight and second weight such that a recess of the arm is located on a protrusion, preferably an axial protrusion, of the second weight.

The method may comprise automatically determining position locations of at least one of the first weight and second weight. The method may comprise measuring displacement of the first weight and/or second weight as it is located on the mattress.

The step of moving the second weight relative to the first weight so that it is a different measured distance apart from the first weight may comprise measuring displacement of the second weight as it is moved. Preferably the step of measuring displacement of the second weight as it is moved is performed automatically. The displacement of the second weight may be measured by measuring revolutions, including any partial revolution, of the second weight as it is rolled across the mattress.

Preferably the method comprises iteratively moving the second weight relative to the first weight and determining any change in angle of the first weight from the second weight being moved. Preferably the step of moving the second weight relative to the first weight so that it is a second measured distance apart from the first weight comprises moving the second weight from one recess of the arm to another recess of the arm. Preferably the second weight is rolled towards the first weight until the protrusion of the second weight is located in a further recess of the arm.

Preferably the step of determining any change in angle of the first weight in response to the second weight being moved comprises taking a measurement using an inclinometer. Preferably the inclinometer comprises a digital protractor. Preferably the method comprises the step of zeroing the digital protractor before taking any measurements. Preferably the step of determining any change in angle of the first weight in response to the second weight being moved comprises automatically taking a measurement using a digital inclinometer at one or more automatically measured displacements of the second weight.

Preferably the step of determining any change in angle of the first weight in response to the second weight being moved comprises taking a plurality of measurements at a plurality of different distances apart. Preferably the measurements are taken at predetermined distances apart. Preferably the predetermined distances are between 10 mm and 100 mm, more preferably between 40 mm and 60 mm, and even more preferably around 50 mm apart.

Preferably the second weight is moved continuously. Preferably the step of determining any change in angle of the first weight in response to the second weight being moved comprises continuously, or at least substantially continuously, measuring the change in angle of the first member as the second weight is moved continuously. Preferably the step of moving the second weight comprises moving the second weight continuously at a constant speed. Preferably the second weight is moved using a linear actuator.

Preferably the change in angle is accumulated over the measurements and an integral of the rolled angle with respect to distance between the rollers is calculated to determine a total roll together movement metric.

Preferably the second weight is operatively connected to a pair of line members that extend from a drive system. Preferably the line members are made of wire or rope. Preferably the step of moving the second weight relative to the first weight comprises retracting the lines members to pull the second weight towards the first weight. Preferably he lines members are retracted using a drive system. Preferably the method further comprises the step of measuring the force required to pull the second weight across the mattress. Preferably the force is measured using a force gauge. Preferably the force measurement is utilised to determine torque of the second cylinder.

In another form, there is provided an apparatus for testing roll together of a mattress, preferably carrying out the method as hereinbefore described, the apparatus comprising:
a first weighted cylinder;
a second weighted cylinder;
an inclinometer mounted to the first weighted cylinder; and
a displacement measurement system to measure displacement of the second weighted cylinder relative to the first weighted cylinder.

Preferably the displacement measurement system comprises an arm mounted to the first weighted cylinder with a plurality of distance indicators at a plurality of predetermined distances from the first weighted cylinder. Preferably the indicators comprise a recess. Preferably second weighted cylinder comprises a centrally located protrusion. Preferably both cylinders comprise a centrally located protrusion and the arm is mounted to the protrusion of the first weighted cylinder.

Preferably the inclinometer comprises a digital protractor. Preferably at least one of the arm and inclinometer are removably mounted to the first cylinder. Preferably the first weighted cylinder and second weighted cylinder are interchangeable. Preferably the mass of the weighted cylinders is variable. Preferably the apparatus further comprises a drive system configured to move the second weighted cylinder across the mattress. Preferably the drive system comprises one or more actuators. Preferably the actuators are linear actuators operatively connected to an axle of the second weighted cylinder.

Preferably the apparatus further comprises line members extending from a drive system to the weighted second cylinder. Preferably the line members are wire or rope. Preferably the line members and drive system are configured such that actuation of the drive system retracts the line members. Preferably retraction of the line members pulls the second cylinder towards the first cylinder. Preferably the apparatus further comprises a force gauge. Preferably the force gauge is configured to measure force required to pull the second cylinder across the mattress.

Further features and advantages of the present invention will become apparent from the following detailed description.

BRIEF DESCRIPTION OF THE DRAWINGS

By way of example only, preferred embodiments of the invention will be described more fully hereinafter with reference to the accompanying figures, wherein.

DETAILED DESCRIPTION OF THE DRAWINGS

Figure 1:
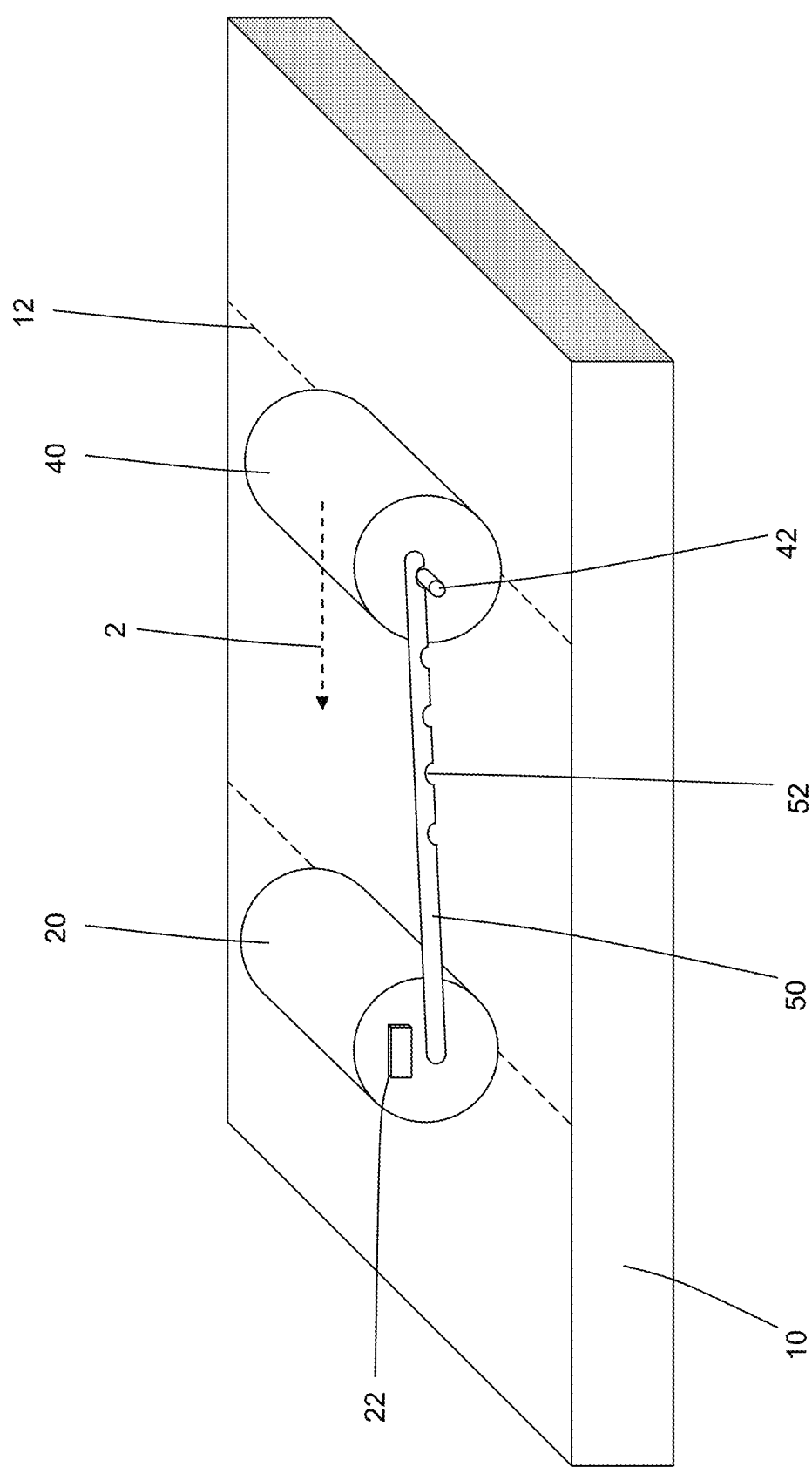
FIG. 1 illustrates a diagrammatic view of an apparatus testing roll together of a mattress in a first measurement position.
Figure 2:
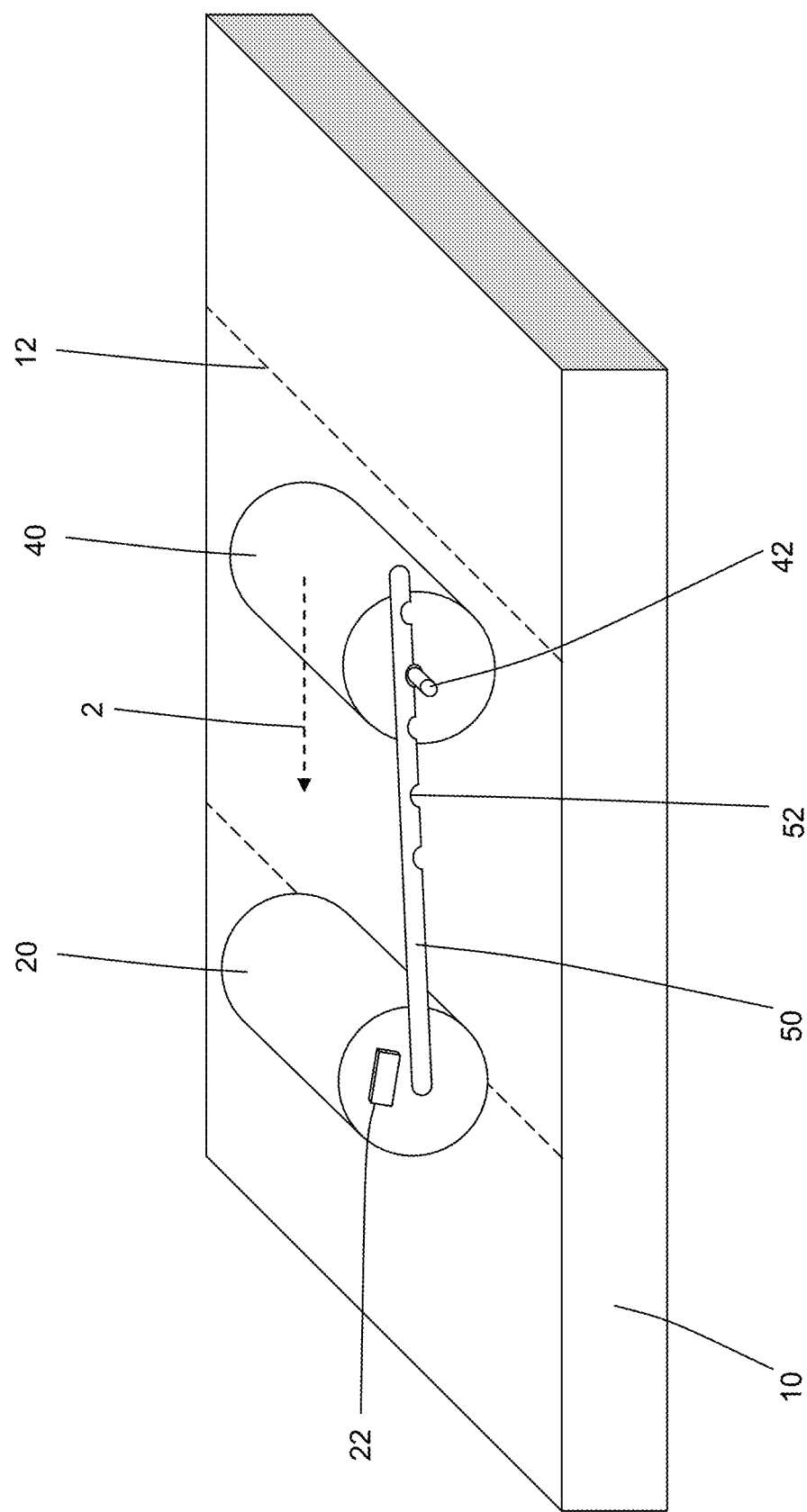
FIG. 2 illustrates a diagrammatic view of the apparatus testing roll together of a mattress of FIG. 1 in a second measurement position.

FIGS. 1 and 2 illustrate a mattress 10 having markings 12. A first weight in the form of a first weighted cylinder 20 and a second weight in the form of a second weighted cylinder 40 are positioned on top of the mattress 10 on the markings 12. An arm 50 extends between the first cylinder 20 and the second cylinder 40. The arm has a series of indicators in the form of recesses 52 at predetermined distances along its length. Although only one arm 50 is illustrated, it should be appreciated that two arms, one on either end of the cylinders 20, 40 could be, and preferably are, provided.

The first cylinder 20 has an inclinometer 22, preferably in the form of a digital protractor, mounted to an end thereof. The inclinometer 22 may be mounted to a bracket (only shown in FIG. 7) located on the end of the first cylinder 20. The inclinometer 22 is configured to measure an angle of the first cylinder 20. Although it is illustrated as being horizontal in FIG. 1, it is not strictly necessary for the inclinometer 22 to start in the horizontal position, rather it may be zeroed or have an initial reading which can be subtracted from subsequent readings to yield a relative angle measurement from an initial position to a further position.

The second cylinder 40 has an axially located protrusion 42. Preferably both the first cylinder 20 and the second cylinder 40 have axially located protrusions 42, and even more preferably they both have two axially located protrusions 42, one at each end. The axially located protrusions 42 are preferably formed by an axle passing through the cylinders 20, 40.

With each cylinder 20, 40 having axial protrusions 42 the arm 50 is preferably removably mountable to any of the protrusions 42 such that the first cylinder 20 and the second cylinder 40 can be interchangeable. Naturally, if the roles of the first cylinder 20 and the second cylinder 40 are reversed, the inclinometer 22 could also be mounted to the second cylinder 20 instead, effectively resulting in the second cylinder 40 becoming the first cylinder 40 and vice versa.

The cylinders 20, 40 preferably each weigh between 40 and 120 kgs, more preferably between 50 and 100 kgs, even more preferably between 60 and 80 kgs, and in a preferred form weigh around 70 kgs.

Figure 3:
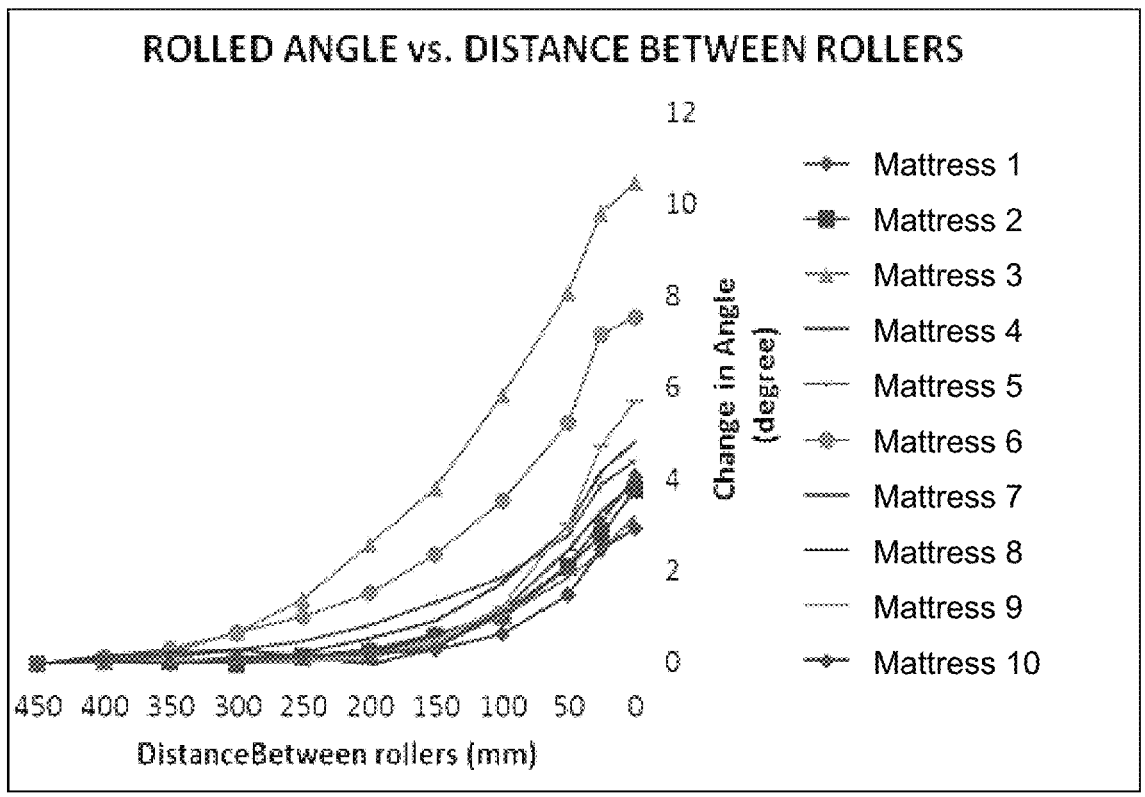
FIG. 3 illustrates a line graph showing roll together measurements of 10 different mattresses.
Figure 4:
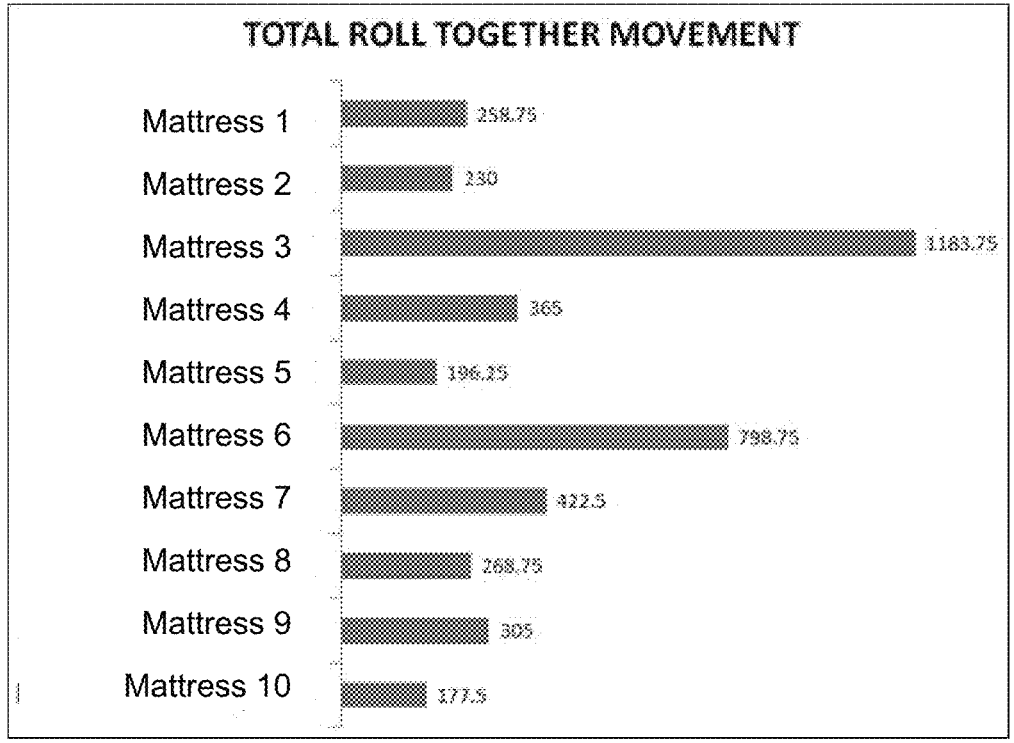
FIG. 4 illustrates a bar graph showing total roll together movement calculations determined from the measurements shown in FIG. 3.

FIGS. 3 and 4 illustrate graphs showing roll together measurements (FIG. 3) and calculated roll together movement metrics to quantify and compare roll together of 10 different mattresses. Example steps undertaken to obtain the measurements illustrated in FIG. 3 are as follows.

Firstly, the mattress 10 is placed on a level supported surface. Markings 12 are then applied to the mattress 10. The markings 12 are preferably determined from a centreline of the mattress 10 and are spaced a predetermined distance from the centreline and the edges of the mattress 10. Preferably the markings form a grid, preferably with two longitudinal markings being spaced approximately 405 mm from the centreline and with two longitudinally perpendicular lines being spaced approximately 400 mm from the short ends of the mattress 12. The markings may be made by any suitable form such as, for example, marker pen or chalk.

Figure 7:
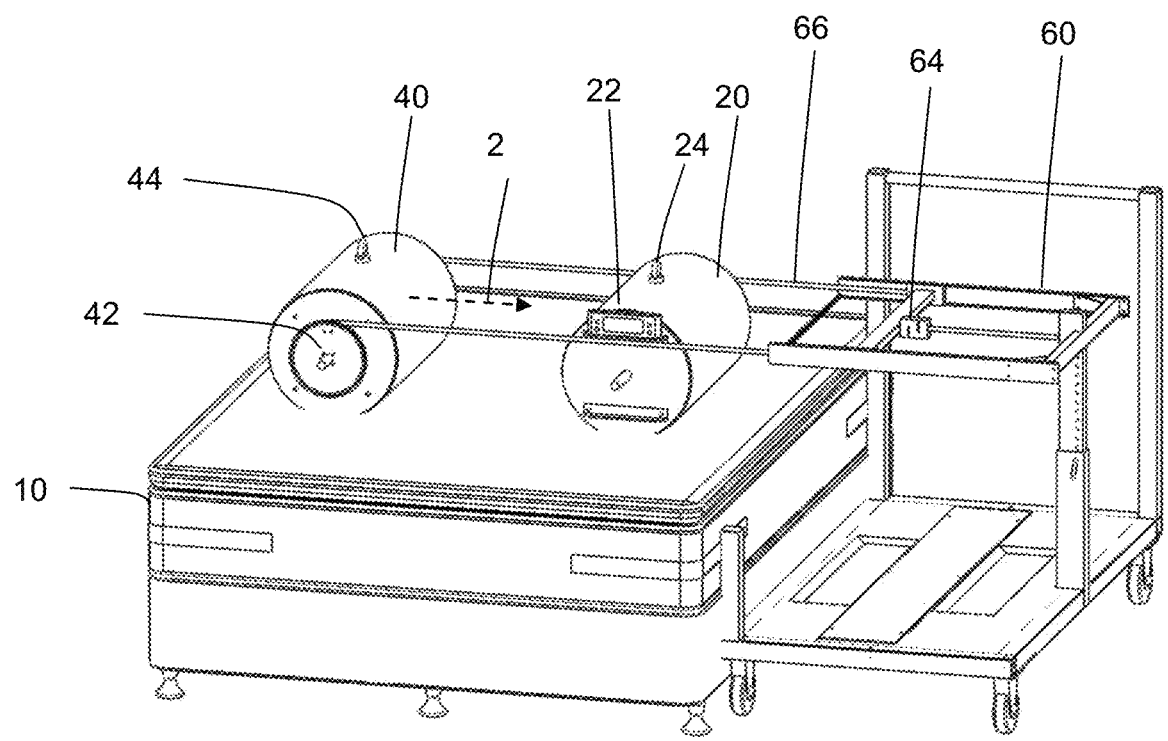
FIG. 7 illustrates a perspective view of another apparatus testing roll together of a mattress.

The first cylinder 20 and second cylinder 40 may then be placed on the mattress 10. As the cylinders 20, 40 are weighted, they are typically very heavy and the assistance of a crane, or the like, may be employed to assist with locating the cylinders 20, 40 on the mattress 10. A removable anchor, such as an eye bolt 24, 44 (as seen in FIG. 7), may be affixed to the cylinders 20, 40 for the purpose of being lifted by the crane.

Once the cylinders 20, 40 are located on the mattress 10, they may be positioned on the markings 12. Specifically, the axial protrusions 42 are preferably aligned with the markings 12. A proximal end of the arm 50 is then mounted to an axial protrusion 42 of the first cylinder 20 and a distal end of the arm 50 is located on the second cylinder 40. The distance between the cylinders 20, 40 on the markings 12 should correspond to an indicator recess 52 of the arm 50 such that the axial protrusion 52 of the second cylinder 40 is received by the recess 52 of the arm 50 as illustrated in FIG. 1.

If not already mounted to the first cylinder 20, the inclinometer 22 is mounted thereto. The inclinometer 22 is then zeroed, or a reference angle measurement is taken, at steady state. The second cylinder 40 is then moved towards the first cylinder 10, as indicated by arrow 2, until the second cylinder 40 reaches a further recess 52 of the arm 50, as shown in FIG. 2. The closer proximity of the second cylinder 40 will typically result in the first cylinder 20 rolling, initially only slightly, towards the second cylinder 40 which results in a change in angle of the inclinometer 22. Once the cylinders 20, 40 are considered to be in steady state, typically by waiting at least 15 seconds, a measurement is taken from the inclinometer.

The process is repeated iteratively, with the second cylinder 40 being moved towards the first cylinder 20 and a measurement taken when the axial protrusion 42 of the second cylinder 40 reaches a recess 52 of the arm 50. Preferably the recesses 52 are spaced apart a predetermined distance from each other, preferably around 50 mm apart. When the second cylinder 40 reaches the final recess 52, which preferably coincides with the second cylinder 40 abutting the first cylinder 20, the final angle measurement is taken from the inclinometer.

Figure 5:
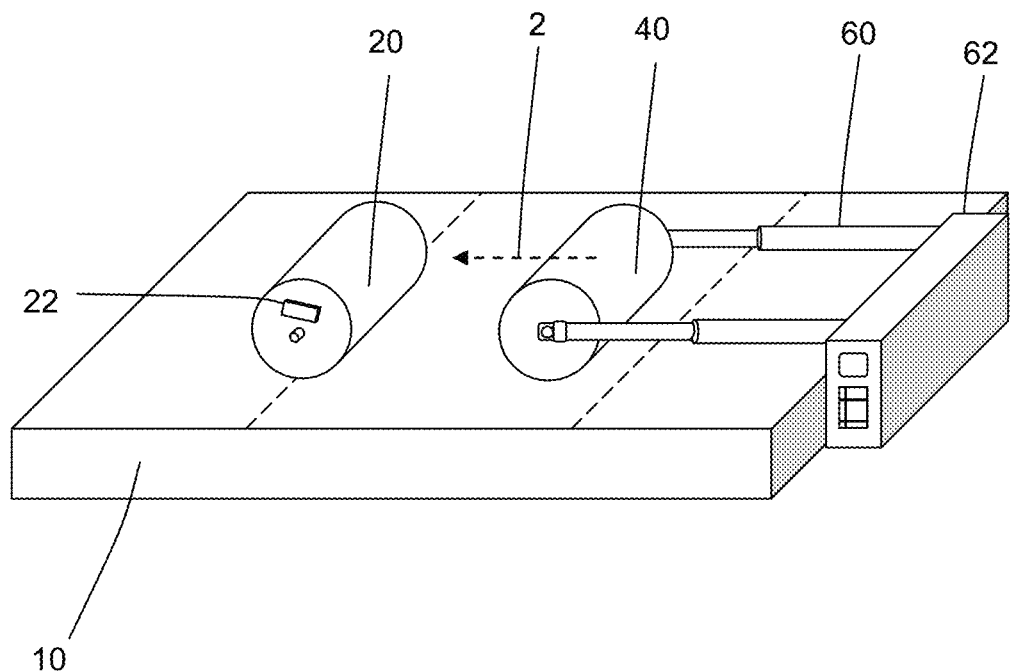
FIG. 5 illustrates a diagrammatic view of an apparatus for automatically testing roll together of a mattress.

FIG. 5 illustrates an apparatus configured to automate the process. As illustrated, the second cylinder 40 is mounted to linear actuators 62 of a drive system 60. The drive system 60 can locate the second cylinder 40 on the mattress 10 and drive it across at least a portion of the mattress 10 by extending the linear actuators 62. The linear actuators 62 may be driven electrically, pneumatically, or hydraulically by the drive system 60.

Figure 6:
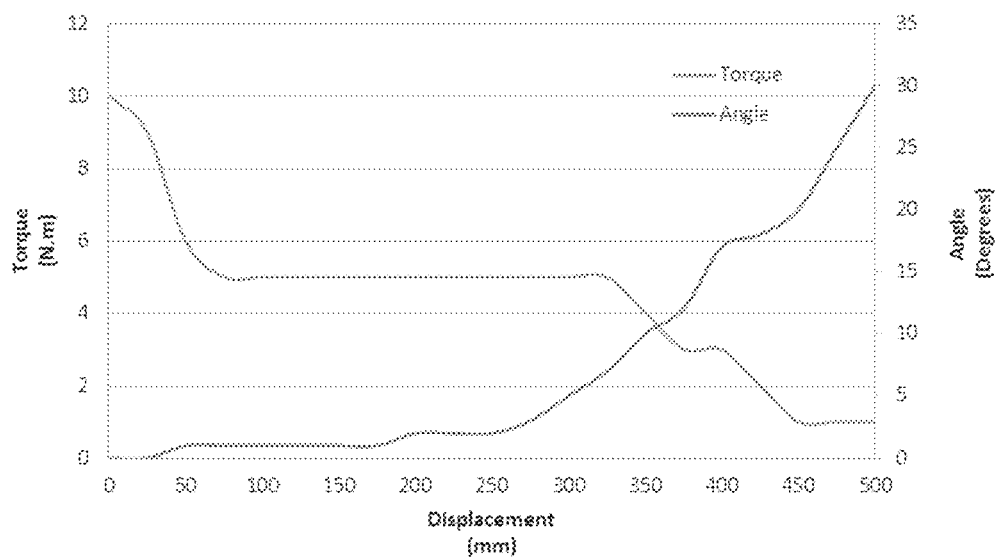
FIG. 6 illustrates a line graph showing continuous angle and torque measurements.

FIG. 7 illustrates an alternative arrangement whereby the second cylinder 40 is configured to be pulled towards the first cylinder 20 instead of pushed. In the arrangement in FIG. 7 the second cylinder 40 is operatively connected to a pair of line members 66, typically made of wire or rope, which extend from the drive system 60. The drive system has a frame that abuts the mattress 10 and an actuator retracts the line members 66 which in turn pulls the second cylinder 40 in the direction indicated by arrow 2 towards the first cylinder 20. A force gauge 64 is provided to measure the force required to pull the second cylinder 40 across the mattress 10, which measurements may be utilised to determine torque of the second cylinder 40 as illustrated in FIG. 6.

Displacement of the second cylinder 40 as it is moved across the mattress 10 may be measured by the drive system 60 and used in conjunction with the angle measurements to form a relationship between changes in distance between the first cylinder 20 and second cylinder 40 and the resultant change in angle of the first cylinder 20.

Although a preferred embodiment is to take measurements at set distances between the cylinders 20, 40 it should be appreciated that a continuous angle measurement may be recorded as the second cylinder 40 approaches the first cylinder 20, preferably at a predetermined rate. FIG. 6 illustrates angle, as well as torque, measurements for a continuous measurement process. Continuous measurements, or at least substantially continuous measurements taken at a high frequency, could be most readily acquired using an automated apparatus such as that illustrated in FIG. 5 or FIG. 7.

In the continuous process the arm 50 is unlikely to be required as its primary purpose is to accurately locate the second cylinder 40 at the predetermined distances from the first cylinder 20. The arm 50 may, however, still be utilised for guidance purposes. In the continuous process the second cylinder 40 is preferably moved at a constant rate and angle measurements are taken continuously, or at least substantially continuously, in response to the constant movement of the second cylinder. Preferably the second cylinder is moved constantly by a linear actuator 62 such as, for example, an electric, pneumatic or hydraulic ram.

Once the measurements have been taken, they can then be plotted as rolled angle of the first cylinder 20 vs distance between the cylinders 20, 40 as shown in FIG. 3 for ten different mattresses or in FIG. 6 for a single mattress in a continuous process. Referring specifically to FIG. 3, mattress 3 very clearly shows the greatest amount of roll together with a change in angle of over 10° as the result of a 500 mm change in displacement of the cylinders 20, 40. Over a similar change in displacement the mattresses which exhibited the greatest resistance to roll together, such as mattress 10, only had a change in angle of around 3°.

Once plotted, the area under the measurements can be calculated by taking an integral of the angle measurements. This area is representative of the total roll together movement allowed by the mattress. FIG. 4 illustrates a bar graph comparing the integral of the measurements for all 10 mattresses where it can be deduced that mattresses 3 and 6 clearly exhibit the greatest roll together movement and mattresses 5 and 10 exhibit the least roll together movement.

Advantageously, the invention allows roll together characteristics of mattresses to be quantified and compared in a repeatable, scientific manner. The method is relatively straight forward and accurately simulates roll together situations likely to occur between two or more people on a mattress 10. Mattresses with enhanced roll together resistance can therefore be readily identified and advertised accordingly.

In this specification, adjectives such as first and second, left and right, top and bottom, and the like may be used solely to distinguish one element or action from another element or action without necessarily requiring or implying any actual such relationship or order. Where the context permits, reference to an integer or a component or step (or the like) is not to be interpreted as being limited to only one of that integer, component, or step, but rather could be one or more of that integer, component, or step etc.

The above description of various embodiments of the present invention is provided for purposes of description to one of ordinary skill in the related art. It is not intended to be exhaustive or to limit the invention to a single disclosed embodiment. As mentioned above, numerous alternatives and variations to the present invention will be apparent to those skilled in the art of the above teaching. Accordingly, while some alternative embodiments have been discussed specifically, other embodiments will be apparent or relatively easily developed by those of ordinary skill in the art. The invention is intended to embrace all alternatives, modifications, and variations of the present invention that have been discussed herein, and other embodiments that fall within the spirit and scope of the above described invention.

In this specification, the terms 'comprises', 'comprising', 'includes', 'including', or similar terms are intended to mean a non-exclusive inclusion, such that a method, system or apparatus that comprises a list of elements does not include those elements solely, but may well include other elements not listed.

The invention claimed is:

1. A method of testing roll together of a mattress, the method comprising the steps of:
    positioning a first weight and a second weight on the mattress a measured distance apart from each other;
    moving the second weight relative to the first weight so that it is a different measured distance apart from the first weight; and
    determining roll together by comparing any change in angle of the first weight in response to the second weight being moved the different measured distance apart from the first weight.

2. The method of claim 1, wherein the mass of at least one of the weights is variable and the method comprises the step of varying the mass of the one or more variable weights until each weight has a predetermined mass.

3. The method of claim 1, wherein the first weight and the second weight are weighted cylinders.

4. The method of claim 3, wherein the first weight is a first weighted cylinder and the second weight is a second weighted cylinder and preferably the weighted cylinders are interchangeable.

5. The method of claim 1, wherein the step of moving the second weight relative to the first weight so that it is a different measured distance apart from the first weight comprises measuring displacement of the second weight as it is moved.

6. The method of claim 5, wherein the displacement of the second weight is measured by measuring revolutions, including any partial revolution, of the second weight as it is rolled across the mattress.

7. The method of claim 1, wherein the step of determining any change in angle of the first weight in response to the second weight being moved comprises taking a measurement using an inclinometer.

8. The method of claim 7, wherein the inclinometer is a digital inclinometer and the step of determining any change in angle of the first weight in response to the second weight being moved comprises automatically taking a measurement using the digital inclinometer at one or more automatically measured displacements of the second weight.

9. The method of claim 1, wherein the second weight is moved continuously and the step of determining any change in angle of the first weight in response to the second weight being moved comprises continuously, or at least substantially continuously, measuring the change in angle of the first member as the second weight is moved continuously.

10. The method of claim 1, wherein the change in angle is accumulated over a plurality of measurements and an integral of a rolled angle with respect to distance between the rollers is calculated to determine a total roll together movement metric.

11. The method of claim 1, further comprising mounting one end of an arm on an axial protrusion of the first weight and locating the arm on the second weight.

12. The method of claim 11, wherein the arm has a plurality of recesses at predetermined measured distances and the step of locating the other end of the arm on the second weight comprises maneuvering one or more of the first weight and second weight such that a recess of the arm is located on an axial protrusion of the second weight.

13. The method of claim 1, wherein the second weight is operatively connected to a pair of line members that extend from a drive system and the step of moving the second weight relative to the first weight comprises retracting the lines members to pull the second weight towards the first weight.

14. The method of claim 13, further comprising the step of measuring the force required to pull the second weight across the mattress using a force gauge.

15. An apparatus for testing roll together of a mattress, the apparatus comprising:

a first weighted cylinder;

a second weighted cylinder;

an inclinometer mounted to the first weighted cylinder configured to determine roll together by comparing any change in angle of the first weighted cylinder in response to the second weighted cylinder being moved; and a displacement measurement system to measure displacement of the second weighted cylinder relative to the first weighted cylinder.

16. The apparatus of claim 15, wherein the first weighted cylinder and second weighted cylinder are interchangeable.

17. The apparatus of claim 15, wherein a mass of the weighted cylinders is variable.

18. The apparatus of claim 15, further comprising a drive system configured to move the second weighted cylinder across the mattress.

19. The apparatus of claim 15, wherein the displacement measurement system comprises an arm mounted to the first weighted cylinder with a plurality of recesses at a plurality of predetermined distances from the first weighted cylinder and the second weighted cylinder comprises a centrally located protrusion configured to be received by a recess of the plurality of recesses of the arm.

20. The apparatus of claim 15, further comprising line members extending from a drive system to the weighted second cylinder.

21. The apparatus of claim 20, wherein the line members and drive system are configured such that actuation of the drive system retracts the line members which in turn pulls the second cylinder towards the first cylinder.

22. The apparatus of claim 20, further comprising a force gauge configured to measure force required to pull the second cylinder across the mattress.

* * * * *